United States Patent [19]

Hohwiller et al.

[11] 3,732,791

[45] May 15, 1973

[54] PAVEMENT AND RAILROAD BED CONSTRUCTION WITH LIGHT CONCRETE SUB-LAYER

[75] Inventors: Frieder Hohwiller, Wacheneheim, Weinstrasse; Klaus Koehling, Frankenthal, Pfalz; Walter Schneider; Dietrich Koenig, both of Ludwigshafen, Rhein, all of Germany

[73] Assignee: Badische Anilin- & Soda-Fabrik Aktiengesellschaft, Ludwigshafen/Rhein, Germany

[22] Filed: Mar. 4, 1971

[21] Appl. No.: 121,175

Related U.S. Application Data

[63] Continuation of Ser. No. 746,010, July 19, 1968, abandoned.

[30] Foreign Application Priority Data

July 27, 1967 Germany............... P 16 58 436.4

[52] U.S. Cl.................... 404/31, 404/32, 161/165
[51] Int. Cl................................................ E01c 9/00
[58] Field of Search........................... 94/7, 10, 4, 22; 260/2.5 B

[56] References Cited

UNITED STATES PATENTS

| | | | |
|---|---|---|---|
| 2,861,895 | 11/1958 | Hardman | 260/2.5 B |
| 3,250,188 | 5/1966 | Leonards | 94/7 |
| 3,257,338 | 6/1966 | Sefton | 260/2.5 B |
| 3,279,334 | 10/1966 | Quartararo | 94/7 |
| 3,361,688 | 1/1968 | Bonitz | 260/2.5 B |

*Primary Examiner*—Nile C. Byers, Jr.
*Attorney*—Matthew C. Thompson

[57] ABSTRACT

Frost barrier for pavements and railroad bed in the form of a layer of light concrete containing particles of organic foam plastics.

10 Claims, 4 Drawing Figures

PAVEMENT AND RAILROAD BED CONSTRUCTION WITH LIGHT CONCRETE SUB-LAYER

RELATED APPLICATION

This application is a continuation of our application Ser. No. 746,010, filed July 19, 1968, now abandoned.

This invention relates to a new non-frost susceptible layer for pavement construction (including footpaths, roads, airfield runways and railroad beds). In conventional pavement construction, a non-frost susceptible material (for example sand, gravel, broken stone, foam lava, blast furnace slag and the like) is used in a fairly thick layer as a frost barrier.

It is known to use in pavement construction, for insulation and drainage, a thin layer of dehydrated soil and a layer of a high grade insulating material having a thermal conductivity ($\lambda$ value) of less than 0.2, for example foam plastics, mineral wool, foamed glass or cork.

The use of a layer of foam plastics as an insulating layer in pavement construction is known from U.S. Pat. No. 3,250,188.

Furthermore the use of expanded clay (prepared from certain clays or shales by heating in a rotary kiln) combined with cement or bitumen as a non-frost susceptible layer in pavement construction is known.

These known non-frost susceptible materials have a number of disadvantages. When using gravel, thick layers are necessary. For example a gravel layer of 40 to 80 cm is used, depending on soil conditions, in motorway and turnpike construction in the German Federal Republic. Transport and labor costs are therefore very high. High grade insulating materials such as boards of foam plastics, foamed glass, cork and the like often have only slight mechanical strength. Before conventional roadmaking machinery can be driven over the non-frost susceptible layer for the purpose of applying the base course, a layer of binder and the wearing course, it is necessary to cover the insulating layer with for example a layer of sand to avoid mechanical damage. Using expanded clay is disadvantageous because this material can become strongly saturated with water after some time, so that the frost resistance and particularly the thermal insulation are effected.

It is an object of this invention to provide a non-frost susceptible sub-layer in pavement construction, which sub-layer does not absorb water, which has high mechanical strength and which does not lose these properties even with repeated frost action.

These and other objects and advantages of the invention are achieved by using concrete containing finely particled organic foam plastics as a frost barrier in pavement and railroad bed construction.

Concrete which contains finely particled organic foam plastics (hereinafter called foam concrete for short) has excellent thermal insulating properties and adequate mechanical strength. Since foam concrete has these two properties combined in an ideal manner, it is possible when using it instead of conventional frost barriers to decrease the thickness of the conventional base course or even wholly dispense with it. Tests have shown surprisingly that foam concrete does not become saturated with water even when the soil moisture is high. Contrasted with concrete prepared using expanded clay, its frost resistance is not decreased and its thermal insulating effect is only affected to a negligible extent.

These properties are of particular importance in pavement construction. When ice forms in the concrete structure, the binding agent is surprisingly not damaged so that the strength is practically unaffected. Tests of the frost resistance according to German Standard DIN 52,104 followed by comparative tests of flexural strength show no appreciable difference in appearance and strength values of specimens before and after frost tests.

Foam concrete is known to be obtained by mixing finely particled organic foam plastics with ordinary concrete, i.e. a mixture of hydraulic binder, water and any aggregates followed by setting; it has a low unit weight, of from about 200 to 1500, particularly from 300 to 700, kg/m$^3$. The finely particled foam forms the pores and at the same time fills them. The concrete accordingly has a substantially regular cellular structure of plastics particles in a mortar skeleton.

Suitable finely particled organic foam plastics generally have a mean particle size of from 1 to 20, particularly from 1.5 to 5 mm and a bulk density of from 2 to 200 kg/m$^3$, particularly from 5 to 50 kg/m$^3$. The foam is used in the form of particles having irregular shape, e.g. flakes, or preferably in globular or bead form. The nature of the organic plastics is of minor importance. All conventional organic foam plastics such as expanded polyethylene, polypropylene, polybutylene, polyurethanes or polycarbonates, are useful as fillers. It is particularly advantageous to use inexpensive foams having substantially closed cell structure such as those based on styrene polymers. Plastics foams which have been prepared from expandable plastics containing finely particled expanding agents by simple heat treatment are preferred because in this case expansion can be carried out in the immediate vicinity of the job site and thus the cost for conveying the voluminous foam plastics can be avoided.

Foam concrete generally contains from 30 to 95 percent, particularly 60 to 85 percent, by volume of plastics foam. Owing to the very low density of the plastics foam, its proportion by weight in the foam concrete is very small, generally less than 3 percent, particularly less than 2 percent, by weight. This is a very favorable cost factor.

Conventional hydraulic binders such as lime, gypsum and preferably cement, to which if desired conventional aggregates such as sand, trass and quartz powder may be added as well as other conventional concrete aggregates such as pore-forming substances, waterproofer, plasticizers and the like, may be used for the production of the foam concrete, in addition to the foam plastics particles. Depending on the consistency of the mixture, the water:cement factor is generally from 0.3 to 0.5. The ratio of hydraulic binder to aggregates may vary within wide limits. Generally up to 3 kg of aggregates is used per kg of hydraulic binder. If the unit weight of the foam plastics concrete is very low (less than 700 kg/m$^3$), i.e. the content of foam plastics is high, the amount of aggregate should be as small as possible (about 0 to 1 kg per kg of cement).

In order to achieve uniform wetting of the foam plastics particles with the hydraulic aggregates, it is usual to add superficially to the plastics particles a small amount (about 1 to 20 percent by weight with reference to the plastics) of a substance which is compatible with cement and which increases adhesion of the plastic to the mineral constituents, for example an organic binder, an adhesive, a polymer dispersion, an epoxy resin or an organic silicon compound. It is also possible to add the adhesion promoter direct to the mixture. Slabs for example may be prepared from this mixture. The mixture may however be applied immediately to the subgrade at the place of use and allowed to set there, with or without compaction. This method, which can be carried out with conventional roadmaking equipment, is particularly advantageous.

The thickness of the layer of foam concrete may be varied within wide limits and depends upon practical requirements. Depending on the heat transfer coefficient of the foam concrete used, the thickness required for the climatic conditions prevailing in the area concerned may easily be calculated. Thicknesses of from 5 to 50 cm, particularly from 10 to 30 cm, are generally used depending on climatic and mechanical requirements.

The layer of foam concrete may be jointless, there being practically no shrinkage. It may also have dummy joints or expansion joints with or without pegging. It may also be in the form of slabs which may be reinforced, with or without interlocking or pegging. It is also possible to use a granulate of foam concrete as an insulating layer.

The foam concrete layer may be applied direct to the subgrade, which may have been compacted. Any desired subbase, for example sand, gravel, crushed rock or old road surface materials (broken up if desired) or a vapor barrier or a water-retaining layer may be present, however, between the subgrade and the foam plastics concrete.

The base and wearing courses used above the foam plastics concrete layer do not differ from those conventionally used in roadmaking. Further layers, for example vapor barriers, may be provided between the said layers and the layer of foam concrete.

A conventional bituminous base followed by a wearing course may for example be applied by the conventional hot method to the foam concrete layer. A conventional concrete layer may also be applied direct to the foam concrete layer. Since the foam concrete layer itself has supporting properties however, the layers applied thereto may be thinner or the base course may be entirely dispensed with.

Foam concrete may be flattened with conventional roadmaking machinery such that, for example, prefabricated concrete slabs used as the base course are laid direct thereon, this preferably being carried out on foam concrete which has not yet completely set.

Foam concrete layers are suitable as frost barriers and base courses for the construction of railway beds and pavements of all types, for example roads, footpaths, skating rinks and airport runways.

THE DRAWING

Embodiments of the invention are illustrated in the drawing wherein.

Figure 1:
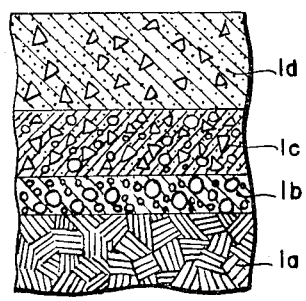
FIG. 1 is a fragmentary cross section of concrete pavement on a compacted sub-grade with gravel and foam concrete as sub-layers.
Figure 2:
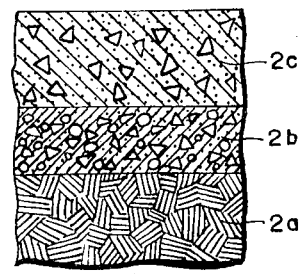
FIG. 2 is a fragmentary cross section of concrete on a compacted sub-grade with a foam concrete sub-layer.
Figure 3:
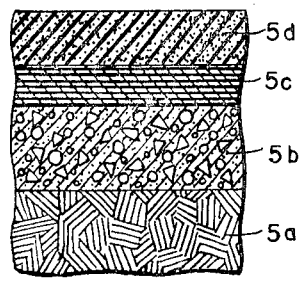
FIGS. 3 and 4 are fragmentary cross sections of a bituminous pavement on a compacted sub-grade with a foam concrete sub-layer.
Figure 4:
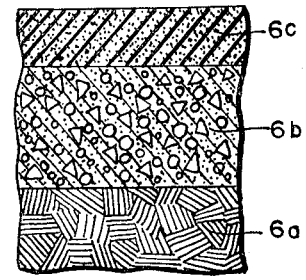

The invention is illustrated by the following example.

EXAMPLE

One m³ of small particles of expanded polystyrene in bead form having a mean particle size of 2.5 mm and a bulk density of 12 kg/m³, which have been coated with 8 percent by weight of epoxy resin, is mixed with 350 kg of cement, 40 kg of fine sand (diameter less than 0.6 mm) and 180 liters of water in a conventional forced circulation mixer. The bulk volume of the mixture is 1.1 m³. The volume is adjusted to 1 m³ by compaction. The foam concrete obtained has the following data after setting (28 days):

| | |
|---|---|
| Bulk density, air dry | about 500 kg/m³ |
| Flexural strength, wetted through | 3 kg/cm² |
| Flexural strength after frost test (DTN 52,104) | 3 kg/cm² |
| Compressive strength | 25 kg/cm² |
| Heat transfer coefficient, dry | 0.08 kcal/m.h.°C |

The following pavements are prepared using this foam concrete:

Cement concrete surface:
1. a. subgrade, compacted
   b. gravel, 5 to 10 cm
   c. foam concrete layer, 10 to 20 cm (poured in situ)
   d. concrete, 16 to 24 cm (poured in situ)
2. a. subgrade, compacted
   b. foam concrete layer, 10 to 20 cm
   c. concrete, 16 to 24 cm (poured in situ)
3. a. subgrade, compacted
   b. foam concrete layer, 10 to 20 cm
   c. prefabricated concrete slabs, 15 to 18 cm
4. a. subgrade, compacted
   b. prefabricated slabs as composite slabs of a 10 to 20 cm layer of foam concrete and a 15 to 18 cm layer of prestressed heavy concrete.

Bituminous surface:
5. a. subgrade, compacted
   b. foam concrete, 10 to 20 cm
   c. bituminous base, 6 to 22 cm
   d. bituminous binder and wearing courses, 6 to 12 cm
6. a. subgrade, compacted
   b. foam concrete, 10 to 20 cm
   c. bituminous binder and earing courses, 6 to 12 cm.

Railroad bed construction:
7. a. subgrade, compacted
   b. foam concrete, 10 to 30 cm
   c. crushed rock, 10 to 40 cm
   d. sleepers and rails
8. a. subgrade, compacted
   b. foam concrete, 10 to 30 cm
   c. concrete track slabs
   d. rails secured direct to (c).

All the pavements and beds exhibit and outstanding frost resistance.

We claim:

1. Pavement construction comprising a compacted sub-grade having applied directly thereon a thermal insulation layer having a thickness of from 5 to 50 cm and a density of 200 to 1500 kg/m³ and consisting essentially of cured concrete of hydraulic binder which contains 30 to 95 percent by volume of beads of expanded polystyrene having a mean diameter of 1 to 20 mm and a density of 2 to 200 kg/m³ and a substantially closed cell structure, and an upper, pavement layer applied directly on said thermal insulation layer.

2. Pavement construction as claimed in claim 1 wherein said pavement layer is concrete.

3. Pavement construction as claimed in claim 1 wherein said pavement layer is bituminous pavement material.

4. Pavement construction as claimed in claim 1, said thermal insulation layer having a thickness of 10 to 30 cm.

5. Pavement construction as claimed in claim 1, said thermal insulation layer having a density of 300 to 700 kg/m$^3$.

6. Pavement construction as claimed in claim 1, said thermal insulation layer containing 60 to 85 percent by volume of said beads of expanded polystyrene with reference to the concrete in said layer.

7. Pavement construction as claimed in claim 1, said beads having a mean diameter of 1.5 to 5 mm.

8. Pavement construction as claimed in claim 1, said beads having a density of 5 to 50 kg/m$^3$.

9. Pavement construction as claimed in claim 1, said thermal insulation layer containing 1 to 20 percent by weight with reference to said beads of an adhesion promoter.

10. Pavement construction as claimed in claim 1, said hydraulic binder being hydraulic cement.

* * * * *